July 24, 1928.
S. W. RUSHMORE
1,678,272
LUBRICATING AND OIL SEPARATOR APPARATUS
Filed Dec. 29, 1925    2 Sheets-Sheet 1
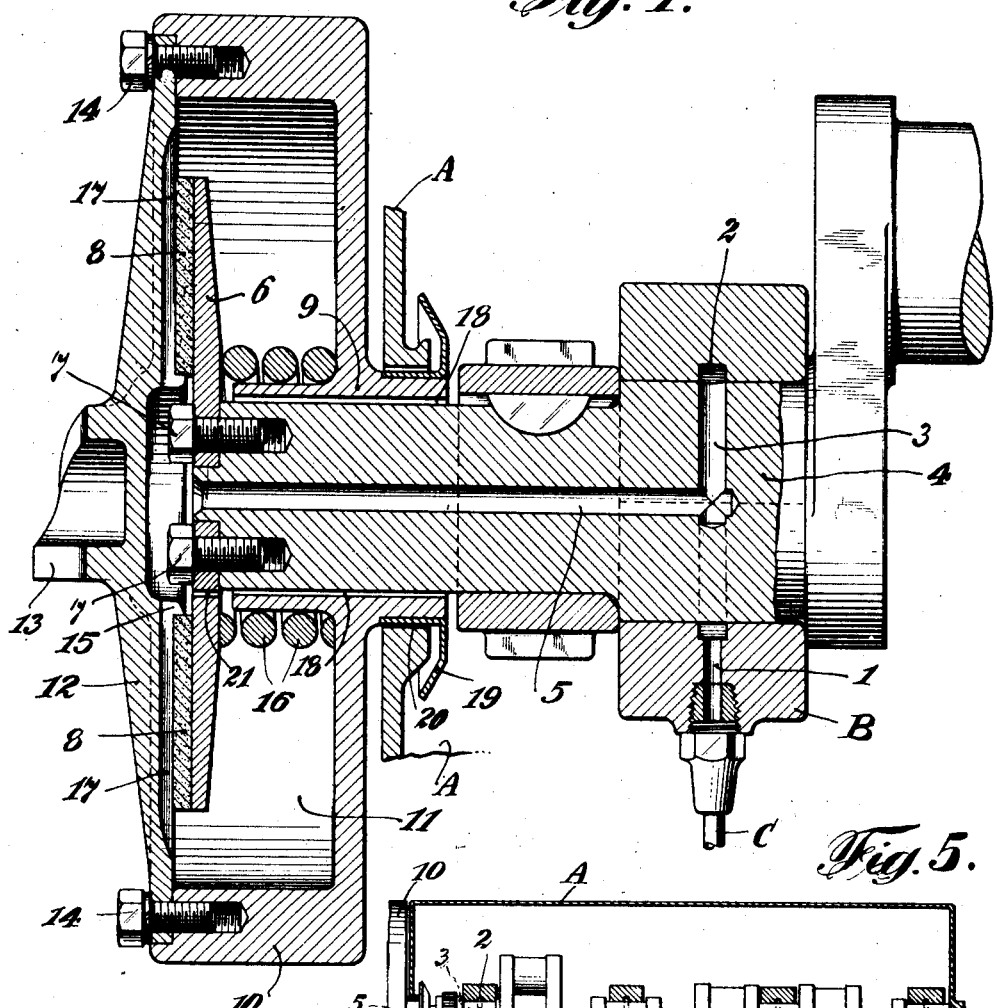
INVENTOR
Samuel W. Rushmore
BY
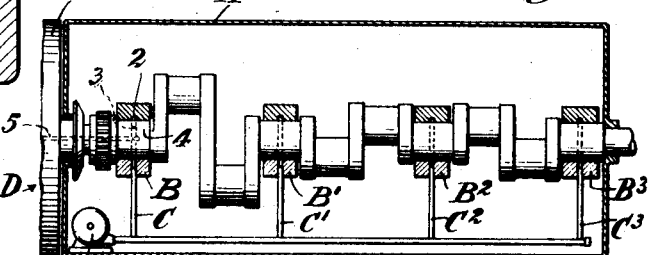
his ATTORNEY

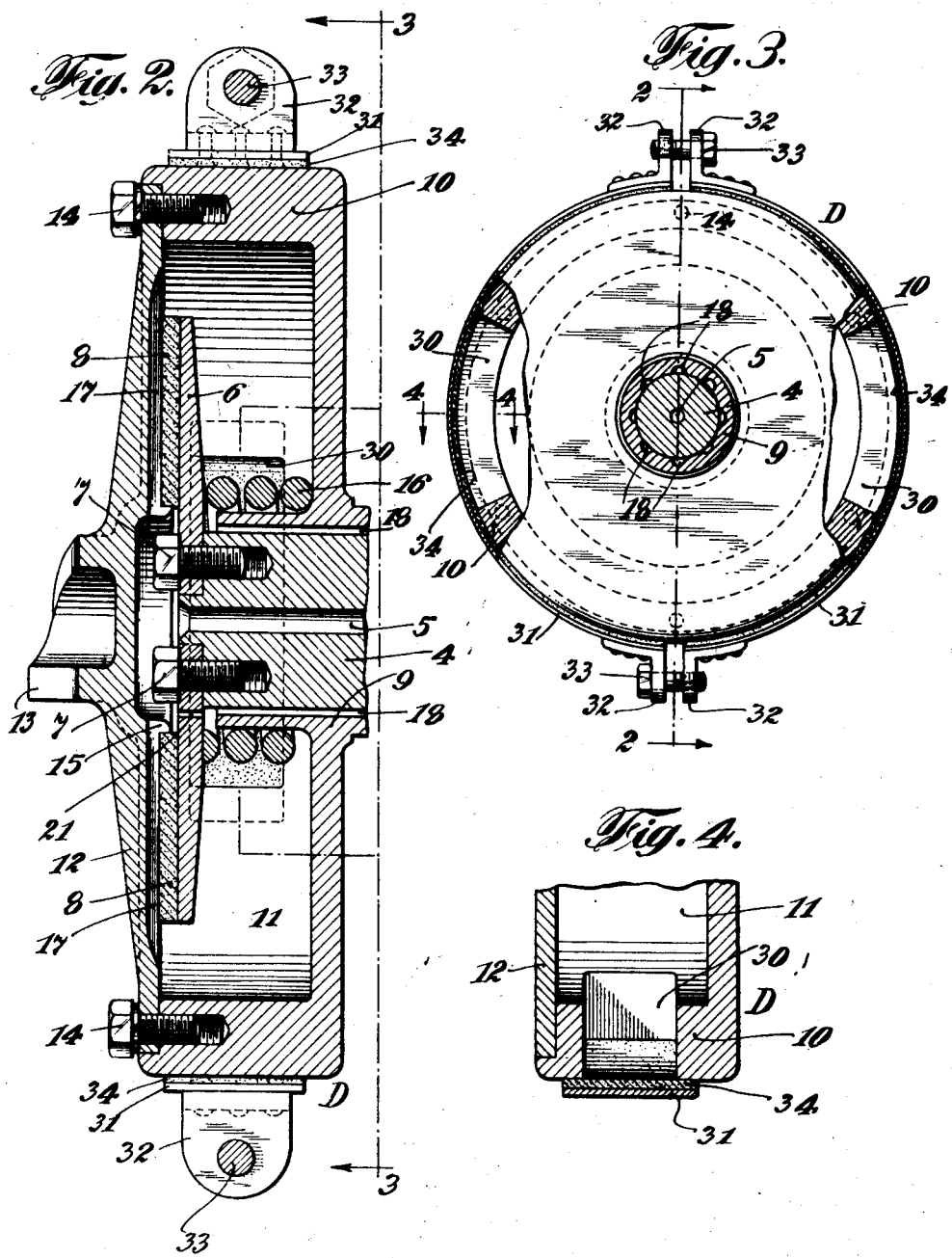

Patented July 24, 1928.

1,678,272

UNITED STATES PATENT OFFICE.

SAMUEL W. RUSHMORE, OF PLAINFIELD, NEW JERSEY.

LUBRICATING AND OIL-SEPARATOR APPARATUS.

Application filed December 29, 1925. Serial No. 78,167.

My present invention is shown as embodied in a system for crank case lubrication of automobile motors, particularly those of the multi-cylinder type, but various features of the invention will be found useful in other relations.

Dilution and deterioration of lubricating oil in the crank cases of automobiles and the causes thereof, namely, gasoline, water, dust, carbon and sludge, are well understood, but the means for obviating or curing such defects are still imperfect. By employment of the steam cooling methods of the type set forth in certain of my prior patents, particularly No. 1,378,724, granted May 17, 1921, crank case dilution by gasoline and water is practically obviated and practically also by sludge. So far as concerns my said system, my present invention relates to cure rather than prevention of dust and carbon in my own system, and for other systems for curing the water and sludge difficulty as well as the dust and carbon.

In the case of a 6-cylinder, water-cooled automobile motor of well known type, I found that a run of but 350 miles in cold weather resulted in relatively large quantities of sludge, the oil, when cleaned by my method, yielding half a pint of water and a heavy sludge concentrated and packed down so as to resemble the consistency of heavy grease or butter.

Centrifugal separator attachments have been used to some extent on certain foreign automobile and aircraft motors, but they have been used as an accessory or attachment, necessarily of small diameter and requiring very high rotative speeds in order to produce any useful effect.

In this situation, one object of my invention is to apply a centrifugal separator directly on the crank shaft of the automobile. Such a separator necessarily contributes a certain amount of flywheel effect with respect to the crank shaft even when applied as a separate attachment, but another important feature of my invention is to utilize as the separator, flywheel elements already in use. On most automobiles the main flywheel is usually more or less inaccessible, and I therefore prefer to utilize the special supplemental flywheel means commonly employed on multi-cylinder engines as inertia and friction damping means for damping torsional vibration of the crank shaft. Such supplemental flywheels are now almost universally used on 8-cylinder automobiles and on many 6's. They are so highly desirable even for 4-cylinder engines that with the added advantage derivable by my present invention, they will doubtless become standard equipment on most, if not all, well built automobile motors.

While there are various ways in which the crank case lubricating oil can be put in circuit from the crank case, a special feature of my invention involves utilizing the end bearing of the crank shaft, adjacent the vibration damper, supplying it with oil through a branch pipe of the oil pump, on the principle now employed for applying oil in hollow crank shafts. In my invention the oil duct leads from the bearing through the shaft into the vibration damper, within which it rotates for a longer or shorter time at the speed of the engine and from which it is permitted to overflow back into the crank case.

The above and other features of my invention may be more fully understood from the following description in connection with the accompanying drawings, in which:

Fig. 1 is an axial section which may be assumed to be horizontal, through the vibration damper and the forward end of the crank shaft, including the adjacent shaft bearing;

Fig. 2 is a similar section, showing a slight modification, the section being on the line 2—2 of Fig. 3;

Fig. 3 is a section with parts broken away, as indicated by the broken lines 3—3, Fig. 2;

Fig. 4 is a section on the line 4—4, Fig. 3.

Fig. 5 is a crank case diagram.

These drawings are diagrammatic so far as concerns the crank case and force feed lubrication, only the utilized portions of these elements being shown. The essentials for illustration of my present invention are the front end of the crank case, A, the forward bearing, B, and the pipe, C, which connects in the usual way with any usual or desired force feed pump for the supply of the lubricating oil to the bearing B. While, in some cases, the motor might be single cylinder and the lubrication by crank case splash, Fig. 5 indicates six cranks with additional bearings, as $B^1$, $B^2$, $B^3$, for the shaft, 1, as also pump, P, and parallel connecting pipes, $C^1$, $C^2$, $C^3$. In this form, the bearings, $B^1$ B², etc., may supply the interior of the crank shaft and, through it, the connecting rods and pistons, as is common in force feed lubricating systems.

The bearing B has the usual radial duct, 1, and annular distributing groove, 2, the latter connecting through radial duct, 3, in shaft, 4, which intersects axial duct, 5, opening through the forward end of the crank shaft into the interior of the virbration damper D.

Except for slight but very important additions, the vibration damper is one of standard type now in use on automobiles, the essential being a clutch disc, 6, rigidly mounted on the end of the shaft as by screws, 7, the forward face engaging with friction material, 8, which may be similar to that used for automobile brake linings. The other clutch member comprises the flywheel element, having a hub, 9, journalled on crank shaft 4, a heavy rim, 10, surrounding an annular cavity, 11, the front face of the cavity being closed in by heavy disc 12, which may have an integral central ratchet boss, 13, for a starting crank. The disc 12 is secured to the forward edge of the rim 10 by bolts 14.

The inner face of this disc may be formed with an annulus, 15, as a centering means, and seat for the above described brake lining material, 8.

The inertia wheel is pressed rearward by a very powerful spring, 16, pressing this member of the clutch against the other member, 6, with such power that the parts are frictionally held against relative movement, and rotate as a unit under all ordinary stresses, slipping only in response to torque vibrations of the shaft, 4, which though minute are of high velocity and of great power. As is well known, this minute slip tends to damp the torque vibration.

This vibration damper, D, may be adapted for my present purpose by delivering oil through the end of the shaft, through duct 5, as above described. In order to provide a circuit for this oil, I have formed radial grooves, 17, 17, in the rear of the lining, 8, extending beyond said lining and opening into the cavity, 11, as shown in the drawings. The oil thus introduced in 11 eventually flows out through slot, 18, formed in the hub 9 of the flywheel, and the hub of the flywheel projects through the forward wall of crank case A as indicated and, within the crank case, as provided, with an annular shield, 19, extending radially a substantial distance so that the returning lubricant will be centrifugally thrown into the crank case. This affords a baffle tending to prevent outlet of oil or inlet of dirt through the clearance space, 20, between the crank case wall and the hub of the flywheel. I have found in practice that when starting the device or at times when there may be an accumulation of air in the passages 3 and 17 and particularly when the cavity 11 is filled with oil, considerable pressure is required to drive this air through the device against the pressure due to centrifugal force in the cavity 11, which may at times exceed the pressure supplied by the oil circulating pump. This difficulty has been overcome by the provision of one or more vent passages, as at 21, which permit free escape of the entrapped air. As the vents 21 are of small cross section as compared with the combined cross section of the radial passages 17, most of the oil will pass through passages 17 and thus be exposed to the maximum centrifugal separating action.

It will be evident that so far as concerns my present invention, the flywheel, D, for damping torque, would operate just as well if it were locked like an ordinary flywheel and that any flywheel would serve such a purpose. The use of the torque chamber is therefore not an essential, but merely a very novel and important, feature of my invention.

In operation, it will be evident that pipe C, which is supplied with oil from the crank case, by the oil pump, in parallel with the other crank bearings, will take oil according to the number of the bearings that may be supplied by the same pump, and all of the oil will therefor be put through the centrifugal separator cavity of the vibration damper many times and at frequent intervals when the car is running. For instance, in a particular case, a 6-cylinder car supplied with pure oil in the crank case will ordinarily run about 1,000 miles per gallon of oil; or, say, 25 miles per hour for 40 hours. Utilizing my invention, the separator wheel was found to hold about a pint, so that for the whole gallon of oil its time in the separator will be about 5 hours of the total 40 hours. I find that so far as concerns separating sludge, this 5-hours of centrifugal separation is equivalent to many days of settling by gravity. For instance, if the inner cavity, 11, is 8 inches inside diameter and rotates 3,000 revolutions per minute, the force tending to separate the heavier material from the oil will be 900 times gravity, so that 5 hours in the separator would be equal to 4500 hours or 190 days settling by gravity. Of course, all of the oil is not located in the extreme inner diameter of the flywheel, and the revolutions per minute are not always 3,000. Nevertheless, the effect obtained will be found to be far in excess of anything necessary in practice; as I have demonstrated by actual experiment with an 8-inch diameter drum running at 3,000 R. P. M., a single pass of the oil, taking only 8 minutes, deposited a half pint of heavy sludge packed in the rim like heavy grease or butter, the oil being lubricant that had been in the crank case during 350 miles of running.

The dirt, carbon, sludge, etc., may be easily removed by taking off the face plate, 12, to expose the entire periphery of the cavity, but as the flywheel or vibration damper is frequently in a location difficult of access, I may provide for cleaning through the periphery by the means shown in Figs. 2, 3 and 4.

Here the parts are all the same as before, except that segmental openings, 30, 30, of desired extent are formed in the rim, 10. These are provided with suitable removable closures, as, for instance, a circumferential clamp which may comprise light and more or less flexible segments, 31, 31, terminating in heavier portions with pairs of upright ears, 32, 32, one of each pair being screw threaded for engagement with clamping bolts, 33, 33. Suitable packing, 34, is interposed to make the closure oil tight. In practice, sludge will quickly seal any slight leak.

Figs. 3 and 4 show that the recesses form pockets for the dirt and sludge and they have the further advantage that they are radially more distant from the axis than cavity 11, and material therein is subject to proportionally greater centrifugal force.

It will be noted clutch member, 6, serves as an annular baffle to prevent short circuit flow from inlet duct 5 directly across to outlets 18 and an element having this function is preferably provided in any other special construction that is used in lieu of the vibration damper.

As applied to a vibration damper, the constant supply of oil to the friction surfaces is an advantage as tending to make the frictional resistance constant and as minimizing wear.

Where the separation is supplied in parallel with pipes leading to other bearings of a pressure feed lubricating system, the supply to the separator may be predetermined or regulated in any desired way, so that the oil will not be fed through the separator too rapidly to permit proper separation of the sediment and impurities. This may be effected by making the pipes and passages of suitable restricted flow section either locally or throughout or by having the annular duct, 2, extend only through a desired arc of the shaft 4.

I claim:

1. In a motor having a plurality of cylinders, a crank case, a crank shaft, and bearings for the shaft, a vibration damper comprising a disc element rigidly mounted on one end of said shaft, a hollow flywheel element housing the disc and frictionally coupled therewith, in combination with a pump drawing oil from the crank case and force-feeding it through a plurality of parallel connected conduits, to the several bearings and, through one of the bearings, to a supply duct in said shaft discharging into the interior between said flywheel element and said disk and an outlet near the axis of the latter, through which the oil flows back into the crank case.

2. In a motor having a plurality of cylinders, a crank case, a crank shaft, and bearings for the shaft, a vibration damper comprising a disc element rigidly mounted on one end of said shaft, a hollow flywheel element housing the disc and frictionally coupled therewith, in combination with a pump drawing oil from the crank case and force-feeding it through a plurality of parallel connected conduits, to the several bearings and, through one of the bearings, to a supply duct in said shaft discharging into the interior of said flywheel element between said flywheel and said disk and an outlet near the axis of the latter, through which the oil flows back into the crank case; the inlet and outlet being on opposite sides of the disc, thus defining circulation of the oil in the flywheel, outward from the inlet and inward toward the outlet.

3. In a motor having a plurality of cylinders, a crank case, a crank shaft, and bearings for the shaft, a vibration damper comprising a disc element rigid with the shaft, a hollow flywheel element housing the disc and frictionally coupled therewith, in combination with a pump drawing oil from the crank case and force-feeding it through a plurality of parallel connected conduits, to the several bearings and, through one of the bearings, to a supply duct discharging into the interior of said flywheel element between said flywheel and said disc and an outlet near the axis of the latter, through which the oil flows back into the crank case; the inlet and outlet being on opposite sides of the disc, thus defining circulation of the oil in the flywheel, outward from the inlet and inward toward the outlet, and the disc being provided with an air vent to the inlet, from near the outlet, for the purpose described.

4. In a motor having a plurality of cylinders, a crank case, a crank shaft, and bearings for the shaft, a vibration damper comprising a disc element rigid with the shaft, a hollow flywheel element housing the disc and frictionally coupled therewith, in combination with a pump drawing oil from the crank case and force-feeding it through a plurality of parallel-connected conduits, to the several bearings and, through one of said bearings, to a connecting duct discharging through the end of the shaft, into the interior of said flywheel element and an outlet formed in the hub of the latter through which the oil flows back into the crank case; and an air vent through said disc, remote from the periphery thereof, for the purpose described.

5. In a motor having a cylinder, a crank case, a crank shaft, and bearings for the shaft, a hollow rotor carried by and rotating with the shaft, in combination with a pump drawing oil from the crank case and force-feeding it through one of the bearings, and a connecting duct discharging through said shaft and delivering oil in a peripheral region within said rotor; and an outlet in the hub of the latter, through which the oil flows back into the crank case; the path within the rotor having an air vent from near the outlet to a point near the inlet, for the purpose described.

6. In a motor having a plurality of cylinders, a crank case, a crank shaft, and bearings for the shaft, a hollow flywheel element frictionally coupled to the shaft, in combination with means for supplying oil to operating parts of the motor and for collecting oil drainings therefrom; and means for circulating the collected oil through said flywheel element and back into the collecting means; said parts including a radical septum defining radial circulation of the oil in the flywheel, first outward from the inlet and then inward toward the outlet, and a vent through said septum, for the purpose described.

7. A motor, including crank shaft, crank case, bearings for the shaft and a hollow rotor mounted on and rotating with the shaft, in combination with means for supplying oil to operating parts of the motor and for collecting oil draining therefrom; and means for circulating the collected oil through said rotor element and back into said collected oil, the rotor having a radial conduit defining radial circulation of the oil therein, first outward toward a region adjacent the periphery and then inward toward the outlet, and a vent from near the outlet, to said radial conduit, for the purpose described.

8. In a motor having a plurality of cylinders, a crank case, and a crank shaft, a radial disc element rigidly mounted on one end of said shaft, bearings for the shaft, and a hollow flywheel element frictionally coupled to the radial element, in combination with a pump drawing oil from the crank case and force-feeding part of it to operating parts of the motor in drainage relation to said crank case and part of it through said shaft between said disc element and said flywheel element and back into said collected oil.

9. In a motor having a plurality of cylinders, a crank case, and a crank shaft, a radial disc element rigidly mounted on one end of said shaft, bearings for the shaft, and a hollow flywheel element frictionally coupled to the radial element, in combination with a pump drawing oil from the crank case and force-feeding part of it to operating parts of the motor in drainage relation to said crank case and part of it through said shaft between said disk element and said flywheel element and back into said collected oil, the radial element defining radial circulation of the oil in the flywheel, first outward from the inlet and then inward toward the outlet.

Signed at Plainfield in the county of Union and State of New Jersey this 26th day of December, A. D. 1925.

SAMUEL W. RUSHMORE.